Patented Dec. 22, 1936

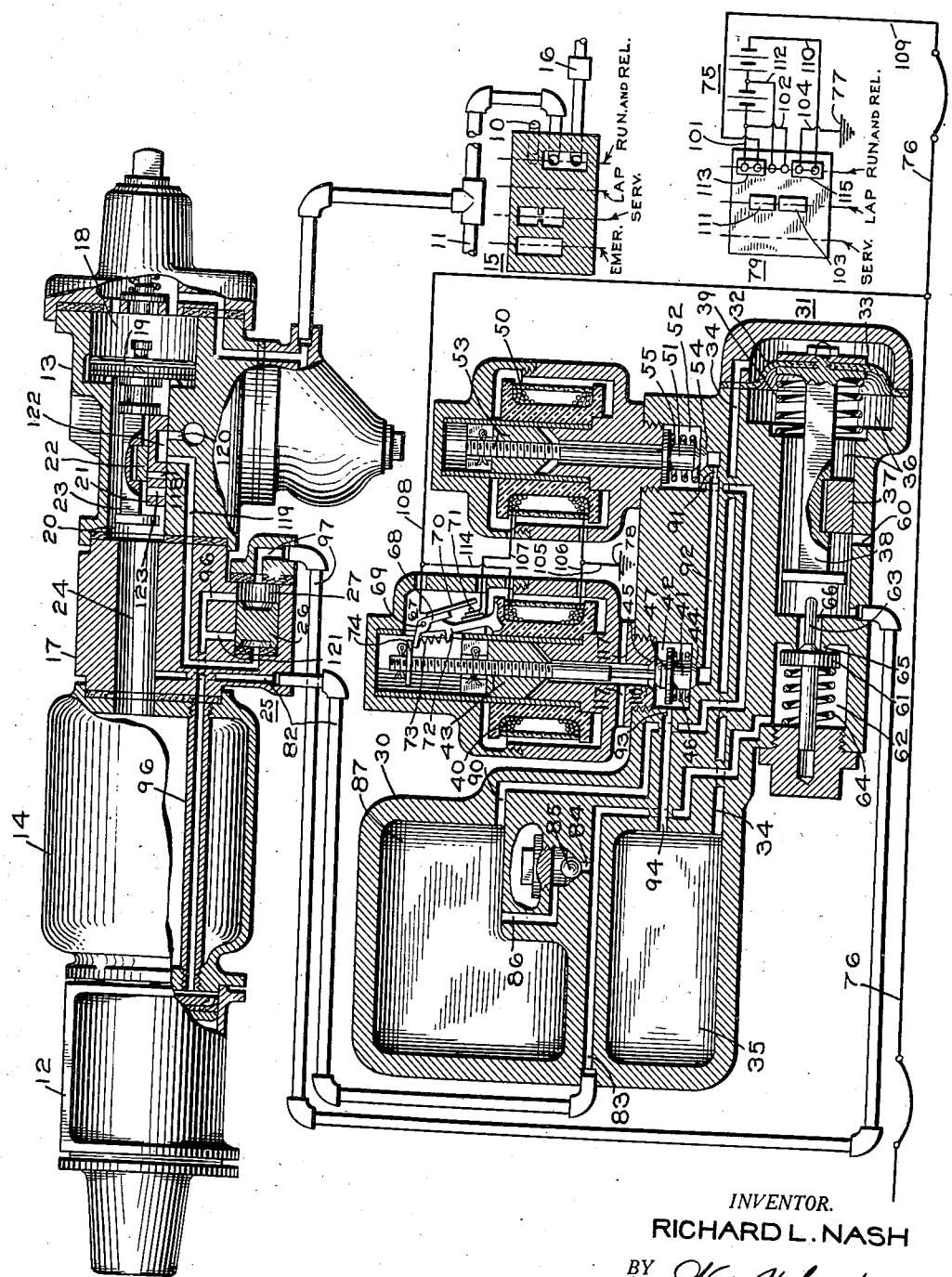
Dec. 22, 1936.  R. L. NASH  2,065,194
ELECTRICALLY CONTROLLED BRAKE
Filed May 9, 1934
INVENTOR.
RICHARD L. NASH
BY *Wm. N. Cady*
ATTORNEY.

2,065,194

UNITED STATES PATENT OFFICE 2,065,194

ELECTRICALLY CONTROLLED BRAKE

Richard L. Nash, Edgewood, Pa., assignor to The Westinghouse Air Brake Company, Wilmerding, Pa., a corporation of Pennsylvania Application May 9, 1934, Serial No. 724,739

7 Claims. (Cl. 303—15)

This invention relates to braking systems, such as employed on trains, and has particular relation to electrically controlled brake systems.

It is an object of my invention to provide means whereby the operation of one electro-responsive device employed in effecting the operation of the brakes affects or controls the operation of another brake operating electro-responsive device.

Other objects of my invention will be made apparent in the subsequent description of one embodiment thereof when read in connection with the accompanying drawing wherein the single figure is a diagrammatic view of the equipment for one car, partly in section and taken together with the control device disposed on another car or on a locomotive, the system being shown in the normal or running and release position.

It will be understood that equipment similar to that to be described for one car is also provided on the other cars and that the equipment on all the cars functions in the same manner as hereinafter described.

Referring to the single figure, the embodiment of my invention disclosed herein comprises the usual pneumatic brake operating equipment including brake pipe 11, brake cylinder 12, triple valve device 13, auxiliary reservoir 14, brake valve 15, feed valve 16 together with an electrical control mechanism embodied in a casing 30. A bracket or casing section 17, suitably interposed between the triple valve device 13 and the auxiliary reservoir 14 is provided for effecting the association of the pneumatic equipment and the electrically controlled mechanism in casing 30.

The triple valve device 13 is of the usual construction, having a piston chamber 18 connected to the brake pipe 11 and containing a piston 19, and a valve chamber 20 containing a main slide valve 21 and a graduating or auxiliary slide valve 22 adapted to be operated by piston 19 through a piston stem 23.

The auxiliary reservoir 14 is open to valve chamber 20 through a passage 24 extending through section 17. Section 17 also contains a double check valve 25, which functions as hereinafter described and comprises a piston 26 operating in a chamber 27 between two opposite positions.

Casing 30 contains a relay valve device 31, and has secured thereto, preferably by means of threaded extensions, a pair of electro-responsive devices such as the electromagnets 40 and 50. The electromagnet 40 controls the operation of a double beat valve 41 contained in a valve chamber 42 and the electromagnet 50 controls the operation of a valve 51 contained in a valve chamber 52, for controlling the operation of the relay valve device 31.

The relay valve device 31 comprises a movable abutment, such as the flexible diaphragm 32, having a chamber 33 at one side connected by a passage 34 to the chamber 35 and having a valve chamber 36 at the opposite side containing a release slide valve 37 adapted to be operated by the diaphragm 32 through a stem 38.

A spring 39, disposed between a flange on the stem 38 in engagement with the diaphragm 32 and a shoulder in the casing wall of chamber 36 urges the diaphragm toward a position wherein the slide valve 37 uncovers an atmospheric exhaust port 60.

A poppet valve 61, contained in a chamber 62 is disposed in alignment with the diaphragm stem 38 and carries a stem 63 adapted to be engaged by the stem 38 when the diaphragm is moved in a direction to cause the slide valve 37 to cover the exhaust port 60. Such engagement of stem 38 with stem 63 does not take place, however, until after slide valve 37 has entirely closed the exhaust port 60, as will be explained later. A spring 64, disposed in chamber 62, biases the valve 61 into seating engagement with an annular rib seat 65 separating valve chamber 62 from a passage 66 through which stem 63 extends and which opens into valve chamber 36.

The electromagnet 40, when suitably energized, as hereinafter described, actuates a plunger and its stem 43 to cause valve 41 to seat on a valve seat 44 and unseat from an oppositely disposed valve seat 45 against the force of a spring 46 disposed between a collar 47 on the valve 41 and a wall of chamber 42. The spring 46 is adapted to bias the valve to unseat from valve seat 44 and seat on valve seat 45 when electromagnet 40 is partially or wholly deenergized.

The electromagnet 40 also controls the operation of a circuit-breaker or switch 67 which may be of any suitable construction and which is illustrated as comprising a bell-crank member 68 pivotally mounted on a fulcrum pin 69, which bell-crank member has one arm provided with an insulated contact member 70 adapted to be moved into engagement with another contact member 71 secured to a stationary supporting bracket 72.

A spring 73, disposed between a shoulder on the supporting bracket 72 and the oppositely extending arm of the bell-crank member is provided for biasing the movable contact member 70 into engagement with the stationary contact member 71. Separation of the contact members of switch 67 is effected by electromagnet 40, when suitably energized as hereinafter explained, by means of a collar 74, suitably secured to an extension of the plunger stem 43, which collar engages and moves the oppositely extending arm of the bellcrank member against the biasing force of spring 73 sufficiently to effect separation of the contact members.

The electromagnet 50, when suitably energized as hereinafter explained, actuates a plunger and stem 53 to cause valve 51 to seat on a valve seat 54 against the opposing force of a spring 55, which is disposed between a collar on the valve 51 and a wall of valve chamber 52 and which biases the valve to unseat from valve seat 54 when electromagnet 50 is deenergized.

The electromagnets 40 and 50 are energized by direct-current supplied from a suitable source, such as a battery 75, through a train wire 76 which extends through all the cars. The battery 75 is adapted to be connected across the train wire 76 and a ground connection 77 and the electromagnets 40 and 50 on each car are connected across the train wire 76 and another ground connection 78. The connection from the train wire to electromagnet 50, however, is through switch 67 so that energization of electromagnet 50 is controlled by switch 67. A wire or return conductor additional to train wire 76 may be employed optionally instead of the ground return shown.

A brake switch 79, illustrated diagrammatically in developed form, is provided on one of the cars or on the locomotive and functions both as a voltage control switch and reversing switch in establishing connections between the battery 75 and the electromagnets 40 and 50, in a manner hereinafter described. In the embodiment shown, brake switch 79 and brake valve 15 are separately operable, the brake valve 15 remaining in running and release position while the brake switch is operated, and vice versa.

The system is charged with fluid under pressure when the brake valve 15 and the brake switch 79 are in release position, fluid flowing from a main reservoir, not shown, by way of feed valve 16 and brake valve 15 into brake pipe 11, whence it flows into the piston chamber 18 of the triple valve device 13 and causes piston 19 to move into release position as shown in the figure. In this position of the piston 19, fluid under pressure flows from piston chamber 18 to the valve chamber 20 through the usual feed groove around piston 19 and from chamber 20 into auxiliary reservoir 14 through passage 24 in the interposed casing section 17.

At the same time fluid under pressure is supplied from passage 24 to chamber 62 containing poppet valve 61 through passage and pipe 82 and passage 83. Fluid under pressure also flows from passage 83 through a branch passage 84, past a ball check valve 85 and thence through a passage 86 into a storage chamber 87.

If it is desired to effect an electrically controlled service application of the brakes, the brake switch 79 is operated to service position, indicated in the figure, wherein the battery 75 is entirely disconnected from the train wire 76, and the electromagnets 40 and 50 are both deenergized.

As a result, double beat valve 41 is unseated from valve seat 44 and seated on valve seat 45 while valve 51 is unseated from its valve seat 54, thereby establishing a communication for the flow of fluid under pressure from chamber 87 to the diaphragm chamber 33, through passage 90 into valve chamber 52, past valve 51, through a restricted opening 91, passage 92 and past the unseated valve 41 into valve chamber 42, whence the fluid flows through a restricted opening 93 and passage 94 into chamber 35 and thereafter through passage 34 into chamber 33. It will be noted that as fluid under pressure flows from chamber 87, fluid under pressure continues to be supplied thereto from auxiliary reservoir 14 which remains in communication with the brake pipe 11 so that the supply of fluid under pressure in chamber 87 is not depleted.

The fluid under pressure supplied to chamber 33 acts on the diaphragm 32 and thus effects movement of the slide valve 37 to a position to close the exhaust port 60, in which position communication between the brake cylinder and atmosphere is cut off, such communication having previously been established by way of pipe and passage 96, double check valve chamber 27, passage and pipe 97, chamber 36 and exhaust port 60.

As the movement of the diaphragm 32 continues beyond that necessary to entirely close port 60, diaphragm stem 38 engages valve stem 63 and causes poppet valve 61 to unseat from rib seat 65, thereby permitting fluid under pressure from the chamber 62 and the auxiliary reservoir 14 to flow into the brake cylinder past the unseated valve 61, through passage 66 into chamber 36, and thence by way of pipe and passage 97, double check valve chamber 27, and passage and pipe 96. Upon such admission of fluid under pressure into the brake cylinder, the piston therein is moved to effect an application of the brakes.

The auxiliary reservoir remaining in communication with the brake pipe as previously explained, fluid under pressure is supplied thereto upon venting of fluid therefrom to the brake cylinder, but such supply is at a relatively slow rate with respect to the rate of venting to the brake cylinder, due to the restriction of the feed groove around the triple valve piston 19.

When the pressure of the fluid in the chamber 36 approaches that of the fluid in chamber 33, spring 39 returns the diaphragm 32 to a position wherein its stem 38 disengages stem 63 of the poppet valve 61, thereby causing the valve 61 to reseat on the rib seat 65 and cut off the further supply of fluid under pressure to the brake cylinder. The movement of the stem 38 is not sufficient, however, to cause the slide valve 37 to crack open the exhaust port 60, due to the remaining unbalance of fluid pressure effective in chamber 33.

By holding the brake switch 79 in service position a sufficient length of time, the operator permits flow of fluid from chamber 87 to chamber 33 until full equalization of pressure is attained therebetween, in which case the full service application of the brakes is made. The brakes may be held applied by allowing brake switch 79 to remain in the service position or by moving the brake switch to lap position, but after equalization of pressures in chambers 87 and 33 has been attained, the movement of the brake switch to lap position is optional.

If it is desired to apply the brakes to a degree less than that of the full service application or if it is desired to apply the brakes in a series of steps or graduations, the brake switch is first moved to service position and held there only long enough to effect a desired degree of brake application, after which the brake switch is moved to lap position.

When the brake switch 79 is in lap position, electromagnet 50 is energized to cause valve 51 to seat on valve seat 54 and thus close the communication for the supply of fluid under pressure from chamber 87 to chamber 33. The circuit for energizing electromagnet 50 extends from the positive terminal of battery 75 to the ground connection 77 by way of conductors 101 and 102, contact member 103 of brake switch 79, and conductor 104, and thence from ground connection 78 through conductors 105 and 106, electromagnet 50, conductor 107, switch 67, conductor 108, train wire 76, conductor 109, contact member 111 of brake switch 79, and conductor 112 to the central negative terminal of the battery 75.

It will thus be noted that a reduced or relatively low voltage is impressed across the train wire and ground. Electromagnets 40 and 50 are so designed that the latter only is operatively responsive to this "low" voltage, the former being ineffectually energized. Thus switch 67 remains closed and enables the continued energization of electromagnet 50.

The continued energization of electromagnet 50 effects the movement of valve 51 to seat on valve seat 54, thereby cutting off the communication for the supply of fluid under pressure to diaphragm chamber 33, as above pointed out.

The approach of equalization in fluid pressures in chambers 33 and 36 on opposite sides of diaphragm 32 effects substantially immediate return movement of diaphragm 32 to close valve 61 to cut off further supply of fluid under pressure from the auxiliary reservoir to the brake cylinder but not sufficient movement to cause the slide valve 37 to crack open the exhaust port 60. Thus the fluid pressure is maintained in the brake cylinder and the brakes are held applied in the degree desired.

Successive steps to increase the degree of application of the brakes are effected, as above described, by repeated movements of the brake switch to service position and then return movement to lap position.

It should be here noted that the function of restricted opening 91 is to so restrict the passage of fluid from chamber 87 to chamber 33 that an appreciable time is required to effect full equalization of pressures in the two chambers. Thus by movement of the brake switch to lap position prior to full equalization of pressures in chambers 87 and 33, a partial application of the brakes may be effected.

If it is desired to electrically effect the release of the brakes after an electrically effected application thereof, the brake switch is moved to release and running position, that is, normal position. In this position of the brake switch, the entire voltage of battery 75, that is a relatively high voltage is impressed across the train wire 76 and the ground connection, and electromagnet 40, which is operatively responsive only to this "high" voltage is thus energized. The circuit for energizing electromagnet 40 extends from the positive terminal of battery 75, through conductor 101, contact member 113 of brake switch 79, conductor 109, train wire 76, conductors 108 and 114, electromagnet 40, and conductors 106 and 105 to the ground connection 78, and thereafter from the ground connection 77 through conductor 104, contact member 115 of brake switch 79 and conductor 110 to the end negative terminal of battery 75.

Upon the effective energization of electromagnet 40, as above described, switch 67 is opened and thus the parallel branch circuit from ground connection 78 to conductor 108, which branch circuit includes electromagnet 50 and switch 67, is immediately opened and electromagnet 50 is not energized except perhaps for a momentary impulse before switch 67 opens. This momentary impulse is, however, ineffective to cause valve 51 to be maintained in closed position, in which position it was maintained by the energization of electromagnet 50 at low voltage, while brake switch 79 was held in lap position.

It will be noted that the polarity of the connections of the battery to the train wire and ground connection is reversed from that when the brake switch 79 is in lap position. The purpose of the reversal of polarity is to ensure proper action of the plungers of the electromagnets 40 and 50 without sticking. Thus the momentary impulse applied to electromagnet 50 is effective to break down any magnetic flux remanence in the field core structure thereof and the energization of electromagnet 40 is effective to first break down any magnetic flux remanence in the field core structure thereof and subsequently to set up a field flux in the opposite direction to positively actuate the plunger and stem 43 to move the valve 41 to seating position on valve seat 44 and unseat it from its seat 45.

The seating of valve 41 on its valve seat takes place at the same time that valve 51 is unseated from valve seat 54. Thus the point of cut-off in the communication between chamber 87 and chamber 33 is changed but in such manner as to prevent an undesired reapplication of the brakes.

With the valve 41 unseated from its seat 45, communication between diaphragm chamber 33 and atmosphere is established by way of passage 34, chamber 35, passage 94, restricted opening 93, chamber 42, past valve 41, passage 116, and exhaust passages 117, and chamber 33 is vented.

As the fluid pressure in chamber 33 decreases below the fluid pressure in chamber 36, the diaphragm is moved in a direction to cause slide valve 37 to open the exhaust port 60, thereby effecting the exhaust of fluid under pressure from the brake cylinder by way of pipe and passage 96, double check valve chamber 27, passage and pipe 97, chamber 36, and port 60, and resulting in the release of the brakes.

If complete release of the brakes is desired, the brake switch is left in the running and release position so that complete venting of chamber 33 occurs, in which case spring 39 returns the diaphragm 32 to the position shown in the figure.

If only a partial release of the brakes or release of the brakes in a series of steps or graduations is desired, the brake switch is first moved to release position and held there only long enough to secure the desired degree of release, after which it is moved to lap position, wherein the valve 41 is seated on its valve seat 45 to cut off further release of fluid under pressure from chamber 33, and valve 51 is seated on valve seat 54 to cut off the supply of fluid under pressure to chamber 33. Successive steps in the release of the brakes, are effective, as above described by repeated movements of the brake switch to release position and return movement to lap position.

The restricted opening 93 functions to restrict the exhaust of fluid under pressure from chamber 33 so that partial or graduated release of the brakes may be effected. The opening 93 is slightly larger than the restricted opening 91, so that the latter primarily controls the timing of the admission of fluid under pressure to chamber 33 from chamber 87, as described above for a service application effected electrically.

In the event that it is desired to operate the brakes pneumatically without resorting to the electrical control above described, the brake switch 79 being in release and running position, the brake valve 15 is moved to service position, as indicated in the figure, wherein a reduction of fluid pressure in the brake pipe 11 through exhaust port 10 of the brake valve 15 effects a corresponding reduction in the fluid pressure in piston chamber 18 of the triple valve device 13. The excess of pressure in valve chamber 20 is thus effective to move the piston 19 to service position in the usual manner, in which position the auxiliary slide valve 22 uncovers the service port 118 in the main slide valve 21, and the main slide valve 21 is in such position that the service port 118 therein registers with brake cylinder passage 119 leading from the seat of the main slide valve to the double check valve chamber 27, while the brake cylinder exhaust port or passage 120 opening at the seat of the main slide valve is lapped.

Fluid under pressure is thus supplied from auxiliary reservoir 14 to brake cylinder 12 through passage 24, chamber 20, service port 118, passage 119, valve chamber 27, branch passage 121 and passage and pipe 96. It will be understood that when piston 26 of the double check valve device 25 is subjected to fluid under pressure from passage 119, it is moved to establish communication from passage 119 to passage 121 and simultaneously to cut off the connection to atmosphere from the brake cylinder through port 69 by closing the communication between passage 96 and passage 97.

Upon substantial equalization of pressures in valve chamber 20 and piston chamber 18, the piston 19 is moved to cause the auxiliary slide valve 22 to lap the service port 118 in the main slide valve 21 and thus cut off the further supply of fluid under pressure from the auxiliary reservoir to the brake cylinder. The exhaust passage 120 remaining lapped by the main slide valve 21, the fluid under pressure in the brake cylinder is retained therein, thus maintaining the brakes applied.

To effect a release of the brakes pneumatically after an application is effected pneumatically, the brake valve 15 is moved to running and release position wherein the brake pipe pressure is increased by connection of the brake pipe 11 to a main reservoir, not shown, through the brake valve 15 and feed valve 16. The corresponding increase in fluid pressure in piston chamber 18 moves the piston 19 and slide valve 21 to release position shown in the figure, wherein brake cylinder passage 119 is connected to exhaust passage 120 through cavity 122 in the main slide valve 21. Thus fluid under pressure is exhausted from the brake cylinder and the brakes are released.

Operation of the brake valve 15 to lap position prior to full application or full release being obtained enables a partial or graduated application and partial or graduated release in the usual manner.

Emergency application of the brakes is effected pneumatically by movement of the brake valve 15 to emergency position which results in such a rate of reduction in fluid pressure in piston chamber 18 as to cause sufficient movement of the slide valve 21 to effect registration of the emergency port 123 with brake cylinder passage 119. The emergency port 123 being larger in cross-sectional area than service port 118 permits a faster rate of flow of fluid under pressure from the auxiliary reservoir to the brake cylinder so that an emergency application of the brakes is effected.

It will thus be seen that I have provided a braking system wherein separately operable control means are provided for effecting the operation of the brakes pneumatically and electrically. It will be seen, further, that I have provided means including a pair of electromagnets, operatively energized at different voltages of opposite polarity, and a switch controlled by one of the electromagnets for controlling the energization of the other electromagnet, whereby the operation and control of the brakes may be effected electrically.

It will be understood that while one specific embodiment has been disclosed, my invention is capable of various changes, omissions and additions, without departing from the spirit thereof. For example the electrical control portion of my invention may be employed to control electro-responsive brake operating means instead of pneumatic means as illustrated.

It is not my intention, therefore, to be restricted in the scope of my invention except as necessitated by the prior art and as defined in the appended claims.

Having now described my invention, what I claim as new and desire to secure by Letters Patent, is:

1. In an electrically controlled brake, in combination, two electro-responsive devices for effecting the operation of the brakes, means for impressing a relatively high voltage and a relatively low voltage on said electro-responsive devices, one of said electro-responsive devices being inherently adapted to be operatively responsive to the said relatively low voltage and the other being inherently adapted to be operatively unresponsive to said relatively low voltage, and circuit-controlling means effective upon the impression of the said relatively high voltage on said electro-responsive devices to prevent an operative response of said one electro-responsive device thereto.

2. In an electrically controlled brake, the combination of a pair of electrically controlled means for effecting the operation of the brakes, one of said electrically controlled means being operatively responsive to a voltage higher than a predetermined voltage and the other being operatively responsive only to a voltage higher than a second predetermined voltage higher than said first predetermined voltage, and means effective when a voltage higher than said second predetermined voltage is impressed on said pair of electrically controlled means for preventing an operative response thereto of the said one electrically controlled means.

3. In an electrically controlled brake, the combination of a pair of electrically controlled means for effecting the operation of the brakes, one of said electrically controlled means being operatively responsive to a voltage higher than a predetermined voltage and the other being operatively responsive only to a voltage higher than a second predetermined voltage higher than said first predetermined voltage, and circuit controlling means operated by the other of said electrically controlled devices to prevent the imposition of voltage on the said one electrically controlled means when a voltage higher than said second predetermined voltage is impressed on the other of said electrically controlled means.

4. In an electrically controlled brake, in combination, a pair of electroresponsive devices for controlling the operation of the brakes, one of said devices being operatively responsive to voltages higher than a predetermined voltage and the other of said devices being operatively responsive only to voltages higher than a second predetermined voltage which is higher than said first predetermined voltage, means for imposing the said voltages on said devices, and means effective upon the imposition of a voltage higher than the said second predetermined voltage on the other of said devices for preventing the operative response of said one device to that voltage.

5. In an electrically controlled brake, in combination, a pair of electroresponsive devices, one of which is operatively energized by a certain voltage and the other of which is non-operatively energized by said certain voltage and operatively energized only by a predetermined voltage higher than the said certain voltage; means for imposing the said voltages on said devices, means for preventing the operative energization of said one device upon the operative energization of the other of said devices, and means controlled by said devices for effecting application of the brakes upon deenergization of both said devices, for effecting release of the brakes upon operative energization of the other of said devices, and for holding the brakes applied upon the operative energization of the said one of the devices.

6. In an electropneumatic brake, in combination, a primary electrically controlled means operative upon deenergization to establish communication through which fluid under pressure is supplied to effect an application of the brakes, a secondary electrically controlled means operative upon energization to close said communication, means for supplying energizing current through a common train wire to both electrically controlled means, and means for interrupting the supply of current to the secondary electrically controlled means upon energization of the primary electrically controlled means.

7. In an electropneumatic brake, in combination, a primary electrically controlled means operative upon deenergization to establish communication through which fluid under pressure is supplied to effect an application of the brakes, a secondary electrically controlled means operative upon energization to close said communication, means for supplying energizing current through a common train wire to both electrically controlled means, means for opening the circuit to said secondary means upon energization of the primary means and for closing the circuit upon de-energization of the primary means, the secondary means being operatively energizable at a lower voltage than the primary means.

RICHARD L. NASH.